July 12, 1949.  L. S. WILLIAMS  2,475,685
DASHPOT FOR WEIGHING SCALES
Filed Nov. 9, 1944
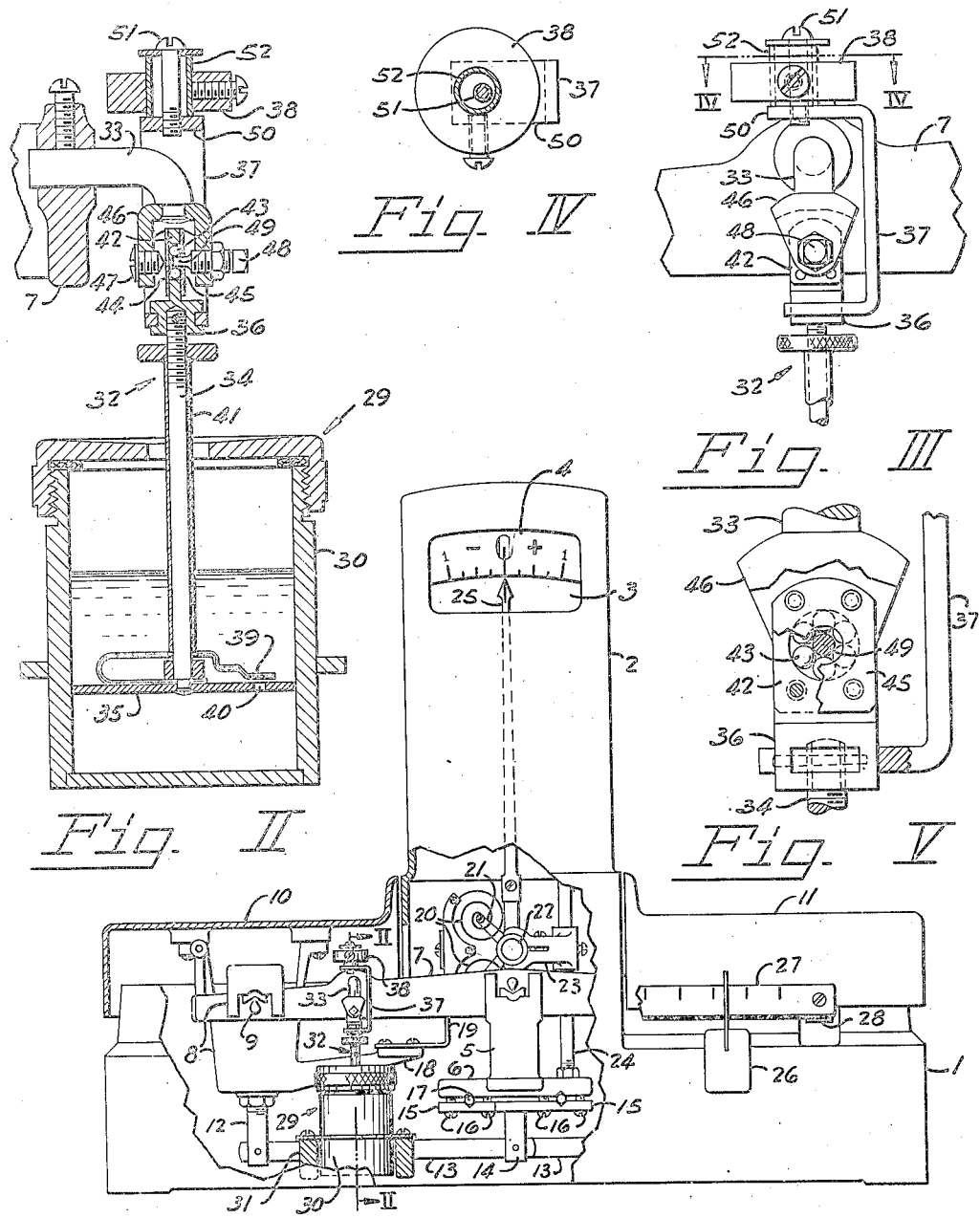
INVENTOR.
Lawrence S. Williams
BY
Marshall & Marshall
ATTORNEYS Patented July 12, 1949

2,475,685

UNITED STATES PATENT OFFICE 2,475,685

DASHPOT FOR WEIGHING SCALES

Lawrence S. Williams, Toledo, Ohio, assignor to Toledo Scale Company, Toledo, Ohio, a corporation of New Jersey Application November 9, 1944, Serial No. 562,607

4 Claims. (Cl. 265—54)

This invention relates to automatic weighing scales and in particular to means for reducing frictional forces between a dashpot plunger and the walls of the dashpot body.

It is common practice to equip a precision automatic weighing scale, whether spring or pendulum counterbalance, with a hydraulic dashpot to control the motion of the lever system so that the indicator will quickly come to rest after a change in load. Dashpots employed for this purpose usually comprise a liquid filled cylinder and a loosely fitted piston operating within the cylinder. The piston is attached, by means of a stem and pivoted connection, to some point of the lever system which moves during a weighing operation. The amount of force developed by the dashpot for a given lever velocity is a function of the clearance between the piston and the walls of the cylinder and the restriction of additional adjustable by-passes. The by-pass may be either an orifice through the piston or a separate tube outside the cylindrical portion of the cup-shaped body of the dashpot interconnecting the portions of the cylinder above and below the plunger. The amount of damping is adjusted by varying the restriction of the by-passes. In order to secure adequate damping under all conditions, it is necessary that the plunger be a fairly close fit within the cylindrical bore of the cup-shaped body. This leads to the difficult problem of securing a close fit without introducing rubbing friction between the plunger and the wall which appears as friction in the scale and thereby reduces its sensitivity. This problem is not too serious when the scale is always used in an exactly level position because it is possible to adjust the connection to the lever so that the plunger hangs substantially free from the walls. However, some scales are built using spring counterbalances and substantially nonpendulous lever systems which will weigh satisfactorily even though they are not level. In these scales, when they are not level, the plunger rubs against one wall of the dashpot body and introduces a noticeable amount of friction.

It is an object of this invention to provide a dashpot in which the rubbing force between the plunger anad the surrounding wall is reduced to a minimum whether or not the scale is level.

Another object of the invention is to provide a dashpot plunger assembly which balances on its point of attachment to the lever of the scale.

Another object is to reduce the friction in a dashpot connection by providing an improved form of connection between a dashpot plunger and a scale lever.

These and other objects and advantages are attained in the structure shown in the drawings used to illustrate the invention.

In the drawings:

Figure I is a front elevation with parts broken away showing a weighing scale embodying the invention.

Figure II is a vertical section at an enlarged scale of the dashpot taken along the line II—II of Figure I.

Figure III is an enlarged fragmentary view of the connection between the dashpot stem and the lever including the plunger balancing means.

Figure IV is a plan view, partly in section, of the balancing means taken substantially along the line IV—IV of Figure III.

Figure V is an enlarged detail, with parts broken away, showing the antifriction pivotal connection between the dashpot plunger and the lever.

These specific figures and the accompanying description disclose a preferred embodiment of the invention but are not intended to impose limitations on the claims.

In the ordinary construction of a dashpot the plunger, which is usually a relatively thin disk attached to a stem, hangs pivotally suspended from a lever with its lower end immersed in a damping fluid contained within a close fitting, rigidly mounted cup. If, because of the arcuate motion of the point of support produced by the arcuate motion of the lever, possible tipping of the scale, or an error in adjustment, the dashpot plunger does not hang free within the surrounding cup it will rub against the wall of the cup and in that manner introduce friction into the scale. This friction may be reduced by reducing the weight of the plunger and stem or by reducing the coefficient of friction between the plunger disk and the wall. This method of attack is limited by the types of material which may be used for the plunger. Another possibility of reducing the friction lies in making the disk of the plunger in the form of a hollow float and thereby utilizing the buoyant effect of the damping fluid on the float to reduce the pendularity of the plunger assembly and thereby reduce the force with which the plunger rests against the side wall of the dashpot body. This method of compensation is objectionable because any change in density of the hydraulic fluid will show up as a change in the zero of the scale. For that reason, in any dashpot, it is desirable to keep the volume of the stem and disk a minimum. Another disadvantage of a hollow float type of dashpot plunger is that the float tends to expand and contract with changes in atmospheric pressure unless it is made very rigid.

A more practical solution is to mount a counterweight from the stem of a dashpot so that the counterweight is above the point of suspension. By adjusting this counterweight it is possible to locate the center of gravity of the plunger assembly exactly at the point of support thereby reducing the pendularity of the assembly to zero and with it the force with which the plunger tends to ride against the wall of the dashpot body.

Full advantage of the reduction in friction obtained by balancing the plunger assembly can not be realized unless the friction in the connection between the plunger assembly and the lever is reduced to a minimum. The invention, therefore, includes the provision of a simple ball bearing connection which allows substantial freedom of swing of a plunger in a direction perpendicular to the plane of movement of the lever and extremely low friction in a direction parallel to the plane of movement of the lever.

While these improvements are applicable to any type of automatic weighing scale they are of particular importance in increasing the accuracy of small portable even balance type scales which are generally used without leveling. Therefore, although the specific description relates to a small scale it is to be understood that its use is not so limited.

The scale selected for illustration is one of the small "over—under" even arm balance. It comprises a substantially rectangular base 1 having an upright tower portion 2 which at its upper end is provided with a window 3 exposing a chart 4.

A pair of pedestals 5 erected from a bridge 6 secured to the side walls of the housing 1 pivotally support a weighing lever 7. Spiders 8, only one of which is shown, are pivotally suspended from knife edges 9 located near the ends of the lever 7 and support counterweight and commodity receiving platforms 10 and 11. Studs 12 depending downwardly from the spiders 8 are pivotally connected to check links 13 which are pivotally secured to posts 14 riveted into brackets 15. The brackets 15 are secured to the underside of the bridge 6 by screws 16. By selective tightening of the screws 16 the brackets 15 are rocked about cylindrical rods 17 to secure precise adjustment of the position of the check links 13.

An arm 18 extending laterally from one of the spiders 8 carries a vertical bracket 19 to whose upper end a pair of spiral counterforce springs 20 are attached. The inner ends of the counterforce springs 20 are secured to arms 21 extending radially from an indicator shaft, not shown. The indicator shaft is carried in antifriction bearings 22 secured in a bracket 23 mounted on a rod 24 extending upwardly from the bridge 6. The upper end of the rod 24 also carries the chart 4. An indicator 25 secured to the indicator shaft cooperates with the chart 4 to indicate small increments of weight. The major portion of a load supported by the load receiving platform 11 is counterbalanced by weights applied to the counterweight platform 10. To reduce the number of weights required, the lever 7 is provided with a poise 26 carried on a beam 27 supported on brackets 28 extending laterally from the lever 7.

The scale is thus essentially an even arm balance scale except that the counterforce springs 20 counterbalance a very small proportion of the capacity of the scale. To prevent continued oscillation of the lever 7 and indicator 25 with changes in load a dashpot 29 is provided. The dashpot 29 comprises a cup-shaped body 30 secured to lugs 31 extending inwardly from one of the side walls of the housing 1. The dashpot is provided with a plunger assembly 32 which is pivotally connected to a goose-necked bracket 33 extending laterally from the lever 7.

The dashpot plunger assembly 32 comprises a stem 34, a plunger disk 35 riveted to the bottom end of the stem, a bearing bracket 36 secured to the upper end of the stem 34, a counterweight bracket 37 and a counterweight 38. The amount of damping afforded by the dashpot is controlled by a thermostatic leaf 39 which is adapted to vary the flow through an orifice 40 in the disk 35. The spacing between the thermostatic leaf 39 and the disk 35 is adjusted by screwing a sleeve 41 circumjacently mounted on the stem 34 up or down. The plunger disk 35 has sufficient clearance within the dashpot body 30 so that it may move freely therein. Yet the clearance between the disk and the wall is kept small to prevent excessive flow of fluid past the edge of the disk which would nullify the adjusting effect of the thermostatic leaf 39 and the orifice 40. The bearing bracket 36, which is threaded and pinned to the upper end of the dashpot stem 34, has a flat upwardly extending portion 42 which is transversely bored so that the bore forms the outer race for a series of bearing balls 43. Flat plates 44 and 45 are riveted to the sides of the flat portion 42 of the bracket 36 to hold the bearing balls 43 in place.

The end of the goose-necked bracket 33 extending from the lever 7 is provided with a downwardly directed U-shaped clip 46 whose downwardly directed legs are drilled and tapped to receive a positioning screw 47 and a bearing screw 48. The bearing screw 48 has a cylindrical portion 49 terminating in a cone point. The cylindrical portion is of such diameter as to form the inner race for the series of bearing balls 43. The flat bearing retaining plate 45 has a clearance hole to admit the cylindrical end of the bearing screw 48 while the other plate 44 is imperforate thus forming a bearing surface positioned between the cone pointed ends of the positioning screw 47 and the bearing screw 48. This provides a substantially friction free pivotal connection between the lever and the dashpot plunger assembly.

The lower cylindrical end of the bearing bracket 36 has slots milled on its sides to receive the lower forked end of the counterweight bracket 37. By crimping the ends of the forked portion of the counterweight bracket it is securely mounted with respect to the dashpot stem. The upper end 50 of the counterweight bracket 37 is bent forward to lie horizontally over the goose-necked bracket 33. This bent over portion 50 is drilled and tapped to receive a vertical clamping screw 51. The counterweight 38, also provided with a locking screw, is vertically adjustable on a bushing 52 which rests on the horizontal portion 50 of the counterweight bracket 37 and is clamped thereto by the screw 51. The bushing 52 is a very loose fit on the screw 51 so that a substantial amount of horizontal adjustment is permitted by positioning the bushing 52 before it is clamped by tightening the screw 51. Vertical adjustment of the center of gravity is obtained by sliding the counterweight 38 vertically upon the bushing 52.

The size of the counterweight 38 may be kept small by making the dashpot stem 34 and plunger disk 35 of aluminum or some light metal alloy while the counterweight 38 and the bushing 52 are made of brass or some other heavy metal. This is preferable to attempting to secure the same result by increasing the volume and floating the dashpot stem and plunger disk because by keeping the volume of the immersed portion of the plunger assembly a minimum changes in buoyant effect due to changes in density of the hydraulic fluid will not cause a serious zero shift or an unbalance in the scale.

The addition of this simple counterweight combined with the frictionless characteristics of the pivotal connection between the dashpot assembly and the beam practically eliminates the dashpot as a source of error or a limitation upon the accuracy of the weighing scale.

Having described the invention, I claim:

1. In a device of the class described, in combination, a weighing scale having a lever, a dashpot for said weighing scale, said dashpot including a member pivotally attached to a lever of said scale, and a counterweight mounted on the member for locating the center of gravity of said member and counterweight substantially at the point of pivotal attachment of said member to said lever.

2. In a dashpot for a weighing scale, a member pivotally attached to a lever and having a depending portion immersed in a damping fluid, and a counterweight mounted on said member above the point of pivotal attachment for reducing the pendularity of said member.

3. In a dashpot for a weighing scale, in combination, a member pivotally suspended from a weighing scale lever, said member having a part thereof immersed in a confined damping fluid, a container for confining said damping fluid, said member being provided with a portion extending above the point of suspension, and a mass adjustably mounted on said portion, said mass being of such magnitude as to substantially balance the immersed part whereby the assembly of said member and said mass is rendered nonpendulous.

4. In a dashpot for a weighing scale, a member that is pivotally supported from a moving part of the weighing scale mechanism, said member having a first portion immersed in a damping fluid and a second portion that extends from the point of pivotal support in a direction opposite the first portion and that is of sufficient mass to counterbalance the first portion so that said member is generally in neutral equilibrium.

LAWRENCE S. WILLIAMS.

REFERENCES CITED

The following references are of record in the file of this patent:

UNITED STATES PATENTS

| Number | Name | Date |
|---|---|---|
| 772,090 | Duquett | Oct. 11, 1904 |
| 1,663,986 | Hurt | Mar. 27, 1928 |
| 1,802,150 | Johnson | Apr. 21, 1931 |
| 1,837,815 | Hadley | Dec. 22, 1931 |
| 2,000,838 | Gorton | May 7, 1935 |